United States Patent
Gupta et al.

(10) Patent No.: US 9,286,943 B2
(45) Date of Patent: Mar. 15, 2016

(54) ENHANCING KARAOKE SYSTEMS UTILIZING AUDIENCE SENTIMENT FEEDBACK AND AUDIO WATERMARKING

(71) Applicant: INTERNATIONAL BUSINESS MACHINES CORPORATION, Armonk, NY (US)

(72) Inventors: Pallavi Gupta, Columbus, OH (US); Deundra Nelson, Charlotte, NC (US); Kirtana Raja, Bellaire, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 13/974,119

(22) Filed: Aug. 23, 2013

(65) Prior Publication Data
US 2015/0055934 A1 Feb. 26, 2015

(51) Int. Cl.
*H04N 9/80* (2006.01)
*G11B 27/10* (2006.01)
*G11B 27/031* (2006.01)
*G11B 27/30* (2006.01)
*G11B 27/32* (2006.01)

(52) U.S. Cl.
CPC ............ *G11B 27/105* (2013.01); *G11B 27/031* (2013.01); *G11B 27/3045* (2013.01); *G11B 27/322* (2013.01)

(58) Field of Classification Search
CPC .................................................... G11B 27/105
USPC .................. 386/241, 239; 725/9, 14; 700/94; 434/307 A
See application file for complete search history.

(56) References Cited

U.S. PATENT DOCUMENTS

| | | | |
|---|---|---|---|
| 2004/0199534 A1* | 10/2004 | Juszkiewicz | G11B 19/027 |
| 2006/0229904 A1* | 10/2006 | Hunter | G06Q 20/1235 705/52 |
| 2012/0207319 A1* | 8/2012 | Tsuchiya | H03G 9/025 381/74 |
| 2012/0331496 A1 | 12/2012 | Copertino et al. | |
| 2013/0070093 A1* | 3/2013 | Rivera | G11B 27/002 348/143 |
| 2014/0172419 A1* | 6/2014 | John | G06F 17/30746 704/201 |

FOREIGN PATENT DOCUMENTS

WO 2012151218 A2 11/2012

* cited by examiner

*Primary Examiner* — Thai Tran
*Assistant Examiner* — Mishawn Hunter
(74) *Attorney, Agent, or Firm* — Patents on Demand P.A.; Brian K. Buchheit; Scott M. Garrett

(57) ABSTRACT

A digital audio/video (A/V) content can be selected from a data store within a computing device. The content can include a vocal free recording and a subsequently recorded vocal track generated by a user. A digital marker can be embedded into the audio signal of the content. The marker can be associated with a time index of the content and a unique user identity associated with a device. A different A/V content can be identified and can be linked to the marker. The different A/V content can be at a symbol, a shape, an audio, a video, and/or a text content. In one embodiment, facial gesture and/or motion gesture feedback of a consumer can be captured during playback of the digital A/V content. In the embodiment, analysis of the feedback can be utilized to generate recommendations for improvement of A/V digital content and/or status updates.

19 Claims, 3 Drawing Sheets

ENHANCING KARAOKE SYSTEMS UTILIZING AUDIENCE SENTIMENT FEEDBACK AND AUDIO WATERMARKING

BACKGROUND

The present invention relates to the field of social media and, more particularly, to enhancing karaoke systems utilizing audience sentiment feedback and audio watermarking.

Karaoke is a world-wide phenomenon which is often performed as a social entertainment where amateur singers sing along to selected music. Frequently, singers can receive immediate feedback from spectators who evaluate the singer's performance of a karaoke song. Unfortunately, the phenomenon has not evolved with today's social networking. Although social networking is a phenomenon that is currently driving interactions between people, social iterations (e.g., social karaoke Web sites) of karaoke lack the real-time interaction and feedback often associated with traditional karaoke. For example, a typical social interaction between individuals using a social karaoke application permits chats to include images and sometimes Web camera interactions.

However, there is no integration of multiple user audio, text and video social interactions. Furthermore, the available social media feedback to the karaoke content does not enable remote users to gather accurate listener responses to their singing, but relies on the manual social interactions. Finally, there is no karaoke system which leverages social feedback from listeners to enhance the social karaoke experience.

BRIEF SUMMARY

One aspect of the present invention can include a system, an apparatus, a computer program product, and a method for enhancing karaoke systems utilizing audience sentiment feedback and audio watermarking. Digital audio/video (A/V) content can be selected from a data store within a computing device. The content can include a vocal free recording and a subsequently recorded vocal track generated by a user. A digital marker can be embedded into the audio signal of the A/V content. The marker can be associated with a time index of the A/V content and a unique user identity associated with a computing device. A different A/V content not previously associated with the digital A/V content can be identified and can be linked to the marker. The different A/V content can be at a symbol, a shape, an audio content, a video content, and/or a text content.

Another aspect of the present invention can include a method, an apparatus, a computer program product, and a system for enhancing karaoke systems utilizing audience sentiment feedback and audio watermarking. A personalization engine can be configured to embed a digital marker into the audio signal of a digital A/V content. The marker can be associated with a time index of the digital A/V content and a unique user identity associated with a computing device. A data store can be able to persist at least one of the digital A/V content, a different A/V content, and an audio watermark mapping.

Yet another aspect of the present invention can include a computer program product that includes a computer readable storage medium having embedded computer usable program code. The computer usable program code can be configured to select a karaoke content within a computing device session. The karaoke content can be a user generated content. The content can be a form of interactive entertainment in which an amateur singer sings along with a previously recorded music. A watermark can be embedded into the karaoke content. The watermark is associated with a singer or a listener. The watermark can be tied to an embedded content and/or an action. The watermark can be associated with a time index of the karaoke content.

DETAILED DESCRIPTION

Figure 1:
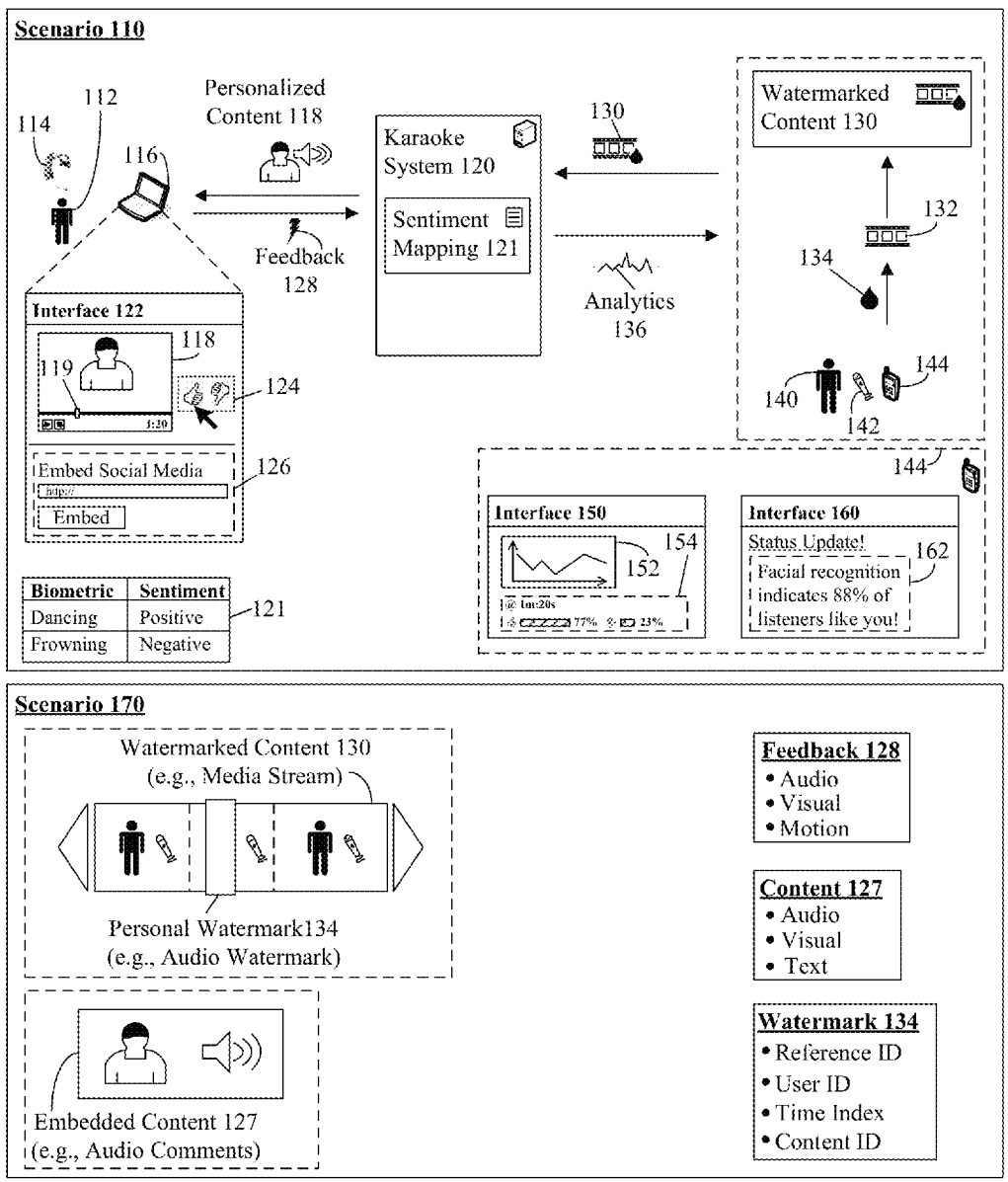
FIG. 1 is a schematic diagram illustrating a set of scenarios for enhancing karaoke systems utilizing audience sentiment feedback and audio watermarking in accordance with an embodiment of the inventive arrangements disclosed herein.

The present disclosure is a solution for enhancing karaoke systems utilizing audience sentiment feedback and audio watermarking. In the solution, an audio watermark can be utilized to embed user specified content within a karaoke content. The audio watermark can be associated with a time index (e.g., timestamp) of the karaoke content. In one instance, feedback from audience (e.g., listeners) of a karaoke content can be automatically gathered. In one configuration of the instance, facial recognition feedback can be obtained in real-time and conveyed to an author of the karaoke content. For example, as a singer sings a karaoke song, real-time feedback from listeners can be conveyed to the singer. In one embodiment, feedback can be analyzed to produce one or more real-time recommendations. In the embodiment, recommendations can be conveyed to a karaoke content creator in real-time to improve content creation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenarios 110, 170 for enhancing karaoke systems utilizing audience sentiment feedback and audio watermarking in accordance with an embodiment of the inventive arrangements disclosed herein. Scenario 110, 170 can be performed in the context of method 200 and/or system 300. In scenario 110, 170, a karaoke system 120 can enable an audio watermarking of a karaoke content to permit dynamic personalized content creation feedback. In one embodiment, scenario 110, 170 can be associated with a social networking environment and/or platform. For example, the scenario can occur between users of a social karaoke Web site. Scenario 110 can illustrate an interaction between two users (e.g., singer and a listener) interacting with karaoke content 132. Scenario 170 can illustrate watermarking of content 132 to create a watermarked content 130. In one instance, disclosure can leverage input components of devices (e.g., 116, 144) to obtain feedback 128 which can be utilized to deliver personalized content 118 to a user 112 and provide real-time feedback to a user 140. For example, a camera of a laptop 116 can be utilized by the disclosure to obtain facial recognition feedback (e.g., facial reactions) of a listener hearing a karaoke song (e.g., content 130) performed by a singer 140.

As used herein, karaoke content 132 can be an audio/video content associated with a musical song. A song can be a composition for a voice or voices to be performed by singing lyrics. The content 132 can include lyrics which can be visually presented within a display and/or interface. The content 132 can lack a vocal recording (e.g., vocal track) and can be an instrumental audio/video content. For example, content 132 can be an instrumental rendering of a popular song on a social karaoke Web site. Content 132 can be associated with one or more metadata attributes. Attributes can include, but is not limited to, a song name, an album name, an artist name, a file reference, a genre, a comment, a year, a size, a tempo, a pitch, a last sung timestamp, a rating, a times sung timestamp, a format, a song identifier, a vocal channel, a graphic channel, a start time, a duration, a track number, and the like. Content 132 format can conform to a MPEG Part 3 (MP3) format, MPEG-4 format, an Advanced Audio Coding (AAC) format, a VORIBS format, and the like.

It should be appreciated that the disclosure leverages audio watermarking (e.g., small marker/code embedded into the karaoke content) to perform the functionality described. That is, because audio watermarking does not require special software (e.g., unlike tagging using audio fingerprinting) the disclosure is not dependent on user participation to access content linked to the watermark. An audio watermark 134 can include, but is not limited to, a noise, a tone, a speech, and the like. For example, watermark 134 can be a user audio speech segment such as "This is me singing".

In one embodiment, the audio watermark (e.g., watermark 134) can associate a marker in a content stream at a particular timestamp. In the embodiment, the marker can be associated with unique symbols, shapes, actions, audio, video, and the like, which can be revealed when the timestamp is reached (e.g., during playback).

In one embodiment, the watermark can enable a security mechanism which can permit/deny modification of karaoke content. That is, the creator can change content that appended using the watermark but can prevent consumers from changing the appended content. In one instance, the watermark can be utilized to permit selected users to view and/or change content 130, 127.

In scenario 110, a user 140 can interact with a device 142, 144 to create and/or modify a karaoke content 132. For example, a singer can sing into a microphone of a mobile phone to sing a karaoke song. During interaction with content 132, user 140 can watermark content utilizing a personal watermark 134. Personal watermark 134 can be a marker embedded in an audio signal (e.g., karaoke content 132) which can identify ownership of the audio. For example, watermark 134 can be a word which can be spoken (e.g., or sung) to watermark a content 132. It should be appreciated that the disclosure permits a personal watermark associated with a user to enable the addition of content at a later date or enable a user to augment the content with social media (e.g., images, comments, videos).

In one embodiment, watermark 134 can be utilized to embed additional content (e.g., embedded content 127) within karaoke content 132. In the embodiment, additional content can be automatically and/or manually associated with the watermark 134. It should be understood that current solutions do not provide for embedding of all types of social media content within the karaoke content (e.g., audio/video stream) using watermarking. It should be appreciated that system 120 can facilitate the functionality described in the embodiment.

Content 130 can be conveyed to karaoke system 120 which can utilize watermarked content 130 to convey personalized content 118 to a user 112. In one instance, the content 130 can be analyzed to determine relevant metadata which can be utilized to perform personalized content 118. In the instance, metadata can be matched against user 112 settings to deliver a personalized user experience. For example, when a content is a rock song with a heavy drum line is determined the system 120 can match the song preference of a user (e.g., listens to only heavy rock songs) to metadata associated with the song (e.g., genre, beats per minute, style). In another instance, content associated with watermark 134 can be utilized to deliver a personalized user experience. In the instance, embedded content 127 can be analyzed to determine when the content matches a preference of a user 112. It should be appreciated that the disclosure is not limited to exact matches and can utilize traditional and/or proprietary content personalization mechanism to enable the functionality described herein.

User 112 can utilize a device 114, 116 to interact with content 118 and/or interface 122. For example, a listener 112 can wear a headset 114 connected to a laptop computer 116 to view a social karaoke Web site interface (e.g., interface 122) and rate a content 130 or content 118. Interface 122 can include, but is not limited to, content 130, feedback mechanism 124, content embedding functionality 126, and the like. In one instance, user 112 can rate portions of content 130 during content 130 playback. For example, a listener (e.g., user 112) can rate a stanza of a karaoke song sung by a singer (e.g., user 140) utilizing a thumbs up or thumbs down interface button. In another instance, feedback from user 112 can be automatically obtained during content 130 playback. For example, a listener (e.g., user 112) speaking a comment about a note the singer (e.g., user 140) sung can be automatically captured by a microphone on laptop 116. That is, feedback 128 can be automatically and/or manually obtained and linked with a time index (e.g., 119) during content 130 playback. It should be appreciated that feedback 128 automatically and/or manually obtained and can be linked with a time index during content 130 creation.

In one embodiment, biometric feedback can be automatically obtained from a user 112 interacting with the playback of content 118 and/or content 130. In the embodiment, sensors within devices 114, 116 can be utilized to collect biometric feedback during content 118, 130 playback. For example, an accelerometer within headset 114 can be utilized to determine if a listener is moving their head in time with music as playback occurs, which can indicate a positive sentiment. In one embodiment, mapping of biometric feedback to audience sentiment can be performed via a sentiment mapping 121.

In one embodiment, mapping 121 can permit the linking of a behavioral biometric feedback with a sentiment. For example, when a user frowns during playback, the sentiment can be determined as negative. It should be appreciated that mapping 121 can be arbitrarily complex. In one instance, mapping 121 can be utilized to distinguish between varying degrees of audience sentiment based on facial gestures. In one embodiment, values (e.g., mapping elements) within mapping 121 can include numerical values, fuzzy logic values, alphanumeric values, and the like. For example, sentiment can be a percentage value (e.g., 90%, 80%) based on a gradient of feedback values (e.g., singing along, humming).

It should be appreciated that biometric feedback can be collected utilizing traditional and/or proprietary mechanisms. In one instance, analysis of biometric feedback can be performed utilizing physiological biometric analysis and/or behavioral biometric analysis. It should be appreciated that biometric feedback can be utilized to perform automated biometric authentication.

In one embodiment, user 112 can embed content 127 within content 130 during playback. In the embodiment, a content embedding functionality 126 can be presented in interface 122, enabling content 127 to be embedded within watermarked content 130 at a specific time index. For example, while listening to a karaoke song performed by a singer, a listener can embed a content via a Uniform Resource Locator (URL) link using dialog 126.

In one instance, playback of the karaoke content can present embedded content to be presented simultaneously. For example, comments can be presented alongside a song (e.g., karaoke) when a consumer is listening to the song.

In one instance, feedback 128 can be conveyed to system 120 in real-time during content 130 creation and/or playback. In the instance, feedback 128 can be analyzed utilizing traditional and/or proprietary mechanism. In one embodiment, real-time analytics 136 can be conveyed to user 140. In the embodiment, analytics 136 can be presented within device 144. For example, analytics can be presented within an interface 150 while content 130 creation is occurring. In one instance, analytics can be presented within utilizing one or more visual graphics. In the instance, analytics can include a graph, a chart, a visualization, and the like. For example, an interface 150 can present an graph 152 of an overall audience sentiment of a content and a text block 154 can present a detailed analytics of a content 130 by time (e.g., at one minute twenty seconds of playback).

In one embodiment, an interface 160 can present analytics indicating audience sentiment after content 130 creation. In the embodiment, a notification 162 can provide audience sentiment obtained from biometric sources (e.g., facial recognition, spoken comments, etc). For example, feedback 128 from facial responses can be presented within a notification 162 to indicate a positive user sentiment (e.g., "88% of listeners like your singing").

In one embodiment, facial gestures or movement (e.g., feedback 128) can be collected in real-time during a content 130 creation and/or playback. In the embodiment, the feedback can be collated and displayed to the user as a dashboard of audience emotion.

In one instance, interface 160 can present one or more recommendations for improving content 130. In the instance, recommendations can include suggested social media updates (e.g., to external social media sites), song preferences, friend preferences, and the like. For instance, a recommendation to convey a TWITTER message can include multiple short messages (e.g., less than 140 characters) from which the user 140 can select.

In one embodiment, a notification can include a social update which can include messages associated with a social networking Web site. In the embodiment, the notification can be conveyed to INSTAGRAM, FACEBOOK, GOOGLE PLUS, and the like. For example, an INSTAGRAM update would present a split screen of sets of pictures (e.g., the listeners' reaction, singer's pictures).

In scenario 170, a watermarked content 130 can include a personal watermark 134 which can enable embedded content 127 to be linked during content 130 creation and/or playback. Watermark 134 can include, but is not limited to, a reference identifier, a user identifier, a time index identifier, a content identifier, and the like. For example, a watermark 134 can be associated with a singer and a singer's favorite quote which can be embedded as content 127. Content 127 can include, but is not limited to, an audio content, a video content, a text content, and the like. It should be appreciated that content 127 can be referenced via a unique identifier (e.g., a URI). Feedback 128 can include audio feedback, video feedback, facial gesture feedback, motion gesture feedback, and the like. In one instance, physical movements associated with a listener can be determined and appropriate feedback can be established. For example, if a listener 112 dances to a song being sung by singer 140, the feedback can be established to be positive.

In one embodiment, system 120 can include traditional and/or proprietary audio mixing functionality. The audio mixing functionality can mix an audio watermark 134 with a content 132 in real-time or near real-time.

Drawings presented herein are for illustrative purposes only and should not be construed to limit the invention in any regard. It should be appreciated that the disclosure is not limited to associating feedback/content with time indices and can associate feedback/content with time intervals. Watermark 134 properties can include, but is not limited to, signal processing robustness, perceptual quality, bit rate, security, computational complexity, and the like. It should be appreciated that the disclosure can utilize spectrum audio watermarking (SSW), amplitude modification, replica method, dither watermarking, self-marking method, and the like.

Figure 2:
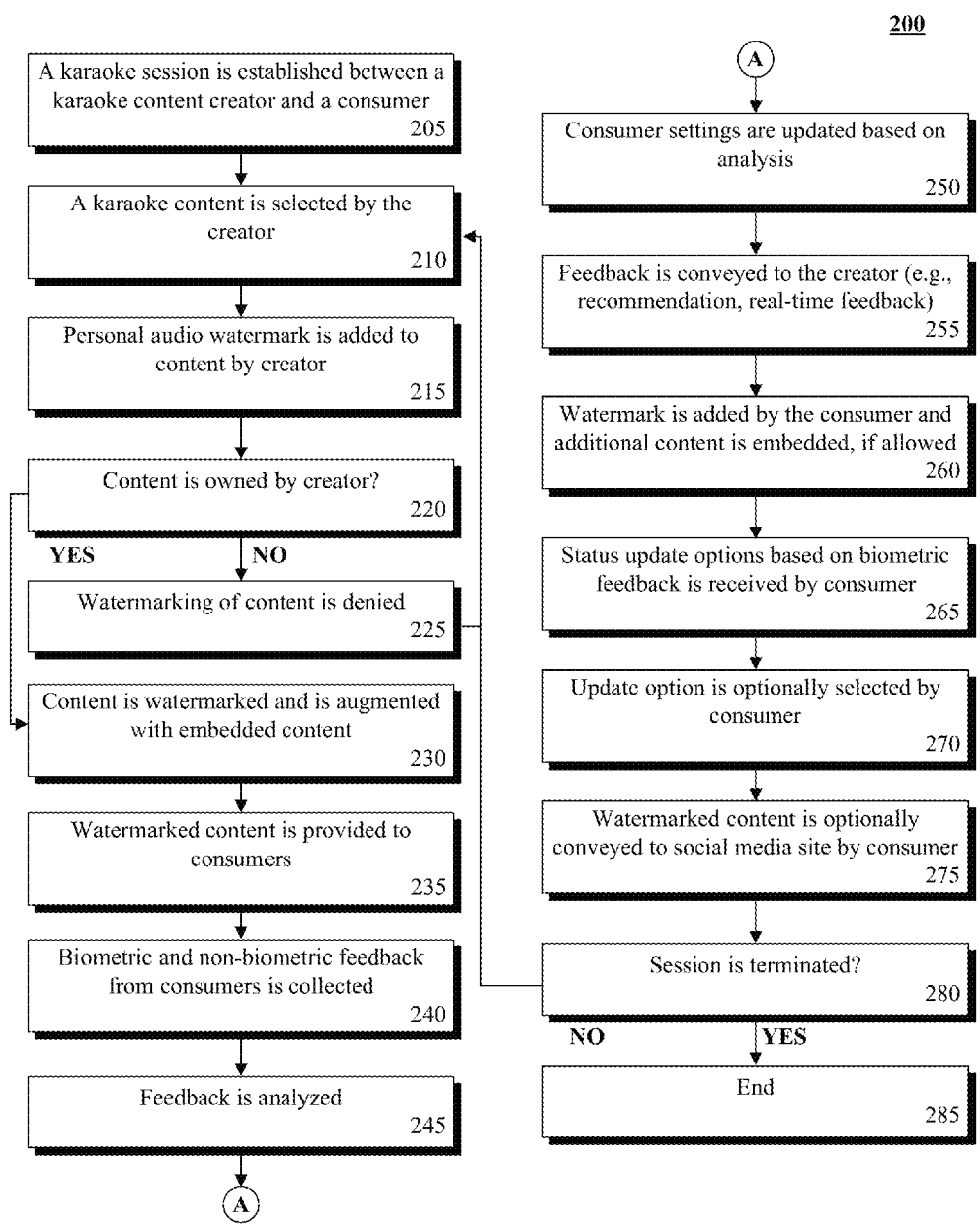
FIG. 2 is a schematic diagram illustrating a method for enhancing karaoke systems utilizing audience sentiment feedback and audio watermarking in accordance with an embodiment of the inventive arrangements disclosed herein.

FIG. 2 is a schematic diagram illustrating a method 200 for enhancing karaoke systems utilizing audience sentiment feedback and audio watermarking in accordance with an embodiment of the inventive arrangements disclosed herein. Method 200 can be present in the context of scenario 110, 170 and/or system 300. Method 200 can be performed in parallel and/or in serial. Method 200 can be performed in real-time or near real-time. In method 200, a personal watermark can be utilized by a singer to embed media content within a karaoke content and/or provide real-time feedback of the karaoke content.

In step 205, a karaoke session can be established between a karaoke content creator and a consumer. In step 210, a karaoke content can be selected by the consumer. Content selection can be manually and/or automatically selected. In step 215, a personal audio watermark can be added to karaoke content by creator. In one instance, the watermark can be manually added using one or more user interfaces. For example, a user preferences settings screen can permit a user to select a previously established audio watermark as a personal watermark to be added to a karaoke content. In step 220, if the watermark content is owned by the creator, the method can continue to step 225, else proceed to step 230. In step 225, the watermarking of the content can be denied. In step 230, the content can be watermarked and can be augmented with embedded content. In one embodiment, permission settings can be manually and/or automatically associated with the content. That is, the watermarked content can be selectively modified by consumers based on permission settings. In step 235, the watermarked content can be provided to consumers. In step 240, biometric and non-biometric feedback from consumers can be collected. In step 245, feedback from the consumers can be analyzed.

In step 250, consumer settings can be updated based on the analysis. In step 255, feedback can be conveyed to the creator. In one instance, a recommendation for improving content creation can be conveyed. In the instance, recommendation can include consumer feedback (e.g., comments), heuristically generated recommendations, and the like. For example, a recommendation can suggest a content create can increase the pitch of their voice during a portion of the content to improve consumer sentiment.

In step 260, a watermark is added by the consumer and additional content can be embedded if permission settings allow modification. In step 265, a status update option based on biometric or non-biometric feedback can be received by the consumer. In step 270, an update option can be optionally selected by the consumer. In step 275, the watermarked content can be optionally conveyed to a social media site by the consumer. In step 280, if the session is terminated the method can continue to step 285, else return to step 210. In step 285, the method can end.

Drawings presented herein are for illustrative purposes only and should not be construed to limit the invention in any regard.

Figure 3:
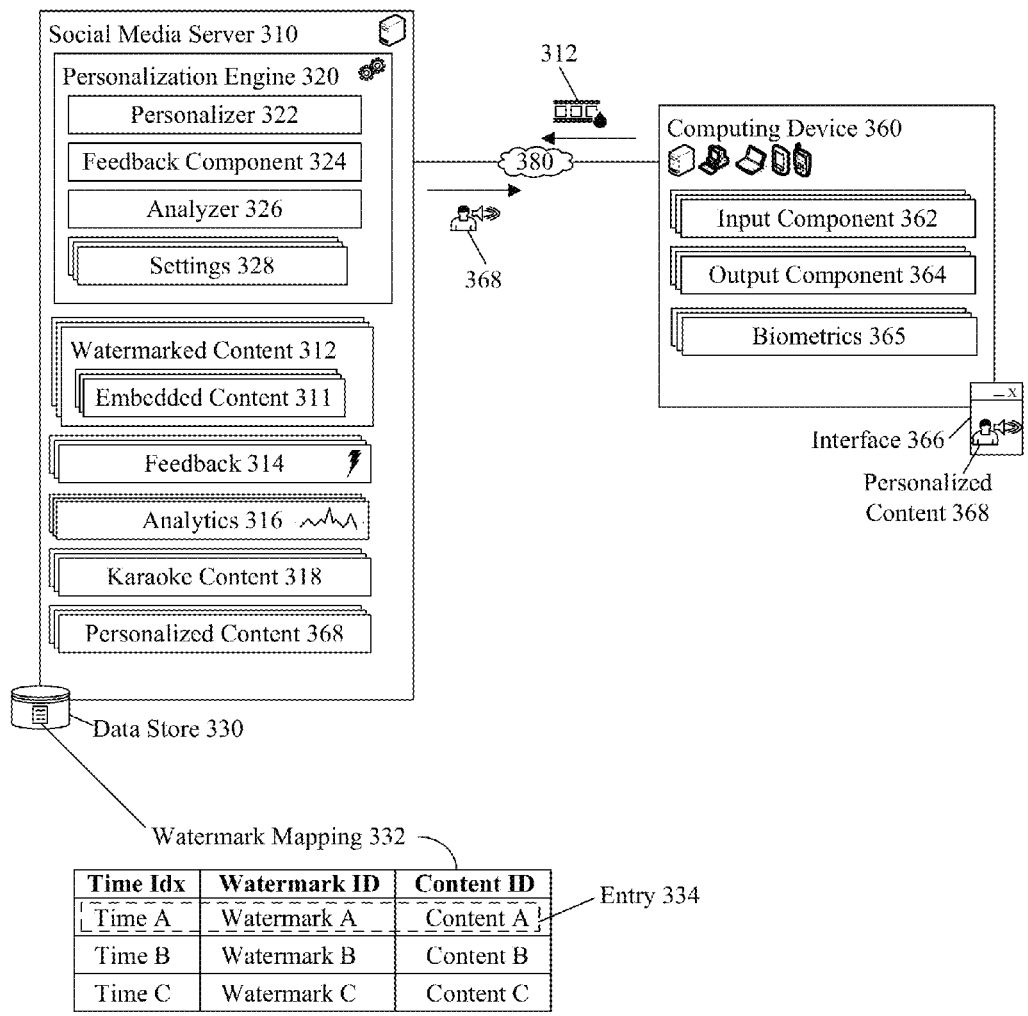
FIG. 3 is a schematic diagram illustrating a system for enhancing karaoke systems utilizing audience sentiment feedback and audio watermarking in accordance with an embodiment of the inventive arrangements disclosed herein.

FIG. 3 is a schematic diagram illustrating a system 300 for enhancing karaoke systems utilizing audience sentiment feedback and audio watermarking in accordance with an embodiment of the inventive arrangements disclosed herein. System 300 can be performed in the context of scenario 110, 170 and/or method 200. System 300 components can be communicatively linked via one or more networks 380. In system 300, a personalization engine 320 permit can utilization of biometrics 365 obtained from computing device 360 to customize personalized content 368. In one instance, watermarked content 312 can be conveyed to engine 320 which can utilize analysis/analytics to deliver a personalized content 368.

Social media server 310 can be a hardware/software entity for executing personalization engine 320. Server 310 functionality can include, but is not limited to, content sharing, social networking functionality, encryption, and the like. Server 310 can include, but is not limited to, personalization engine 320, watermarked content 312, feedback 314, analytics 316, karaoke content 318, embedded content 311, personalized content 368, data store 330, and the like. In one embodiment, server 310 can be a Web server of a social karaoke Web site.

Personalization engine 320 can be a hardware/software element for permitting watermarking of karaoke content. Engine 320 functionality can include, but is not limited to, session management, access control functionality, and the like. Engine 320 can include, but is not limited to, personalizer 322, feedback component 324, analyzer 326, settings 328, and the like. In one embodiment, engine 320 can perform one or more audio watermarking operations. Operations can include digital signal processing such as Linear filtering, sample re-quantization, lossy compression, and the like. In one instance, engine 320 can be a functionality of a browser plug-in. In another instance, engine 320 can be a functionality of a Web based service.

Personalizer 322 can be a hardware/software entity for customizing personalized content 368 based on feedback 314. Personalizer 322 functionality can include, but is not limited to, karaoke content aggregation, content embedding, content history presentation, and the like. In one instance, personalizer 322 can be utilized to present personalized content 368 within an interface 366. In one embodiment, personalizer 322 can be utilized to establish access control associated with a watermarked content 312. In one instance, personalizer 322 can permit the dynamic and automatic creation of personalized listening experience from optimum acoustic settings for an individual as determined by real-time analytics. In the instance, the structure of a person's ear can be analyzed to determine optimum acoustic settings for the listener. Acoustic settings can include, but is not limited to, a volume setting, a content selection, a pitch setting, and the like.

Feedback component 324 can be a hardware/software element for enabling collection of feedback 314 and/or biometrics 365. Component 324 functionality can include, but is not limited to, feedback aggregation, input component 362 registration, and the like. In one embodiment, component 324 can provide notifications during content 312 creation and/or playback. In the embodiment, notifications can include, but is not limited to, feedback 314, analytics 316, personalized content 368, embedded content 311, and the like.

Analyzer 326 can be a hardware/software entity for performing analytics on biometrics 365 and/or feedback 314. Analyzer 326 functionality can include, but is not limited to, lexical analyzer, speech analyzer, video content analytics, and the like. In one instance, analyzer 326 can be utilized to process biometrics 365 obtained from device 360. In one embodiment, analyzer 326 can be utilized to obtain optimum content playback settings. In the embodiment, the analyzer 326 can analyze acoustics proximate to the computing device 360 to determine an optimum acoustic setting.

Settings 328 can be one or more rules for establishing the behavior of system 300 server 310, and/or engine 320. Settings 328 can include, but is not limited to, personalizer 322 options, feedback component 324 settings, analyzer 326 options, and the like. In one embodiment, settings 328 can be manually and/or automatically established. In one instance, settings 328 can be heuristically determined from historic settings. In one embodiment, settings 328 can be persisted within data store 330, computing device 360, and the like.

Watermarked content 312 can be a media content associated with an audio watermark. Content 312 can include, but is not limited to, embedded content 311, metadata, and the like. In one instance, content 312 can be associated with one or more keyword tags. Content 312 can be associated with a visibility attribute, a modification attribute, an expiration attribute, a timestamp attribute, and the like.

Feedback 314 can be one or more data sets associated with content 312 playback. Feedback 314 can conform to one or more traditional and/or proprietary formats. In one instance, feedback 314 can be a text file format, an Extensible Markup Language file format, a Waveform Audio (WAV) file format, a Moving Picture Experts Group (MPEG) file format, and the like. In one embodiment, feedback 314 can be associated with compression.

Analytics 316 can be one or more data sets associated with feedback 314. Analytics 316 can conform to one or more traditional and/or proprietary formats. In one instance, analytics 316 can be a text file format, an Extensible Markup Language file format, Hypertext Markup Language (HTML) file format, and the like.

Data store 330 can be a hardware/software component able to persist mapping 332, settings 328, content 312, feedback 314, analytics 316, personalized content 368, an audio watermark (not shown), and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Watermark mapping 332 can be one or more data sets for associating a watermark with a content 312. Mapping 332 can include, but is not limited to, a time index, a watermark identifier, a content identifier, and the like. For example, mapping 332 can associated a personal audio watermark A with a content A at time index A. Mapping 332 can be manually and/or automatically established. In one instance, mapping 332 can be persisted within data store 330.

Computing device 360 can be a software/hardware element for presenting personalized content 368 and/or creation of content 312. Device 360 can include, but is not limited to, input components 362 (e.g., microphone, camera, keyboard, headset), output components 364 (e.g., display), interface 366, and the like. Device 360 can include one or more biometric sensors. Sensors can include, but is not limited to, an accelerometer, a thermal sensor, a heart rate sensor, and the like. Device 360 hardware can include, but is not limited to, a processor, a non-volatile memory, a volatile memory, a bus, and the like. Computing device 360 can include, but is not limited to, a desktop computer, a laptop computer, a mobile phone, a mobile computing device, a portable media player, a Personal Digital Assistant (PDA), and the like.

Interface 366 can be a user interactive component permitting interaction and/or presentation of content 312, personalized content 368, and the like. Interface 366 can be present within the context of a Web browser application, a karaoke software program, and the like. Interface 366 capabilities can include a graphical user interface (GUI), voice user interface (VUI), mixed-mode interface, and the like. In one instance, interface 366 can be communicatively linked to computing device 360. In one embodiment, interface 366 can permit the management of an audio watermark. In the embodiment, interface 366 can allow audio watermark creation, modification, deletion, and the like.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for enhancing a karaoke system comprising:
   selecting a digital audio/video (A/V) content from a data store within a computing device, wherein the content comprises of a vocal free recording and a subsequently recorded vocal track generated by a user;
   detecting an utterance associated with a consumer interacting with the playback of the digital A/V content;
   when the utterance matches a previously established keyword tag, automatically embedding a digital marker associated with a consumer and the digital A/V content that was selected by the consumer into the digital A/V content at a time index of the utterance's occurrence, wherein the digital marker is associated with time index of the A/V content and a unique user identity associated with a computing device; and
   identifying a different A/V content not previously associated with the digital A/V content and linking the different A/V content to the digital marker, wherein the different A/V content is at least one of a symbol, a shape, an audio content, a video content, and a text content.

2. The method of claim 1, further comprising:
   detecting the digital marker within the digital A/V content during subsequent playback of the digital A/V content; and
   determining a programmatic action associated with the digital marker and programmatically executing a programmatic action during the subsequent playback.

3. The method of claim 1, further comprising:
   detecting the digital marker within the digital A/V content during subsequent playback of the digital A/V content; and
   simultaneously presenting the different A/V content within an interface associated with the subsequent playback of the digital A/V content, responsive to the detecting.

4. The method of claim 1, wherein the digital marker is associated with an access list mechanism, wherein the access list mechanism is configured to selectively allow or deny the presentation of the different A/V content to users within a social karaoke Web site associated with a creator of the digital A/V content.

5. The method of claim 1, further comprising:
   automatically obtaining feedback from the playback of the digital A/V content, wherein the feedback is at least one of a facial gesture feedback, a speech recognition feedback, and a motion detection feedback.

6. The method of claim 1, further comprising:
   programmatically analyzing a feedback from playback of the digital A/V content to determine at least one recommendation, wherein the recommendation describes an enhancement of at least one criterion associated with the digital A/V content.

7. The method of claim 1, further comprising:
   conveying a notification in real-time to a creator of the digital A/V content, wherein the notification is at least one of a feedback from the playback of the digital A/V content and an analytics of the feedback from the playback of the digital A/V content.

8. The method of claim 1, further comprising:
   conveying a notification in real-time to the consumer of the digital A/V content, wherein the notification comprises of a personalized digital A/V content.

9. The method of claim 1, further comprising:
   identifying the consumer of the digital A/V content interacting with the playback of the digital A/V content; and
   obtaining a geometry of the outer ear of the consumer, wherein the structure comprises of at least one of an ear size, an outer ear surface organization, and an ear shape.

10. The method of claim 9, further comprising:
    performing analytics on the structure to determine at least one optimum acoustic setting, wherein the setting is at least one of an orientation of a loudspeaker, an orientation of a consumer, a volume setting, and a pitch setting.

11. The method of claim 1, further comprising:
    automatically obtaining feedback from the playback of the digital A/V content, wherein the feedback is at least one of a facial gesture feedback, a speech recognition feedback, and a motion detection feedback; and
    performing analytics on the feedback to determine at least one optimum acoustic setting, wherein the settings is at least one of an orientation of a loudspeaker, an orientation of a consumer, a volume setting, and a pitch setting.

12. A system for an enhancement to a karaoke system comprising:
    a personalization engine, comprising hardware, configured to embed a digital marker into the audio signal of an digital A/V content, wherein the marker is associated with a time index of the digital A/V content and a unique user identity associated with a computing device; and
    a data store able to persist at least one of the digital A/V content, a different A/V content, and an audio watermark mapping; and
    a component, comprising hardware, configured to:
      detect an utterance associated with a consumer interacting with playback of the digital A/V content; and
      when the utterance matches a previously established keyword tag, automatically embedding the marker, which is a digital marker associated with a consumer and the digital A/V content that was selected by the consumer, into the digital A/V content at a time index of the utterance's occurrence.

13. The system of claim 12, further comprising:
    a personalizer configured to convey the personalized digital A/V content associated with a user preference;
    a feedback component able to automatically collect feedback associated with a consumer interacting with the playback of digital A/V content; and an analyzer configured to perform real-time analytics on the feedback.

14. The system of claim 12, wherein the marker is associated with an access list mechanism, wherein the access list mechanism is configured to selectively allow or deny the presentation of the different A/V content to users within a social karaoke Web site associated with a creator of the digital A/V content.

15. The system of claim 12, wherein the feedback is at least one of a biometric feedback and a non-biometric feedback.

16. The system of claim 12, wherein the engine is configured to identify a consumer interacting with the playback of the digital A/V content, wherein the engine is able to obtain a geometry of the outer ear of the consumer, wherein the structure comprises of at least one of an ear size, an outer ear surface organization, and an ear shape.

17. The system of claim 12, wherein the engine is configured to perform analytics on the structure to determine at least one optimum acoustic setting, wherein the setting is at least one of an orientation of a loudspeaker, an orientation of a consumer, a volume setting, and a pitch setting.

18. A computer program product comprising a non-transitory computer readable storage medium having computer usable program code embodied therewith, the computer usable program code comprising:

computer usable program code stored in the non-transitory storage medium, if said computer usable program code is executed by a processor it is operable to select a karaoke content within a computing device session, wherein the karaoke content is a user generated content, wherein the content is a form of interactive entertainment in which an amateur singer sings along with a previously recorded music; and computer usable program code stored in the non-transitory storage medium, if said computer usable program code is executed by a processor it is operable to insert a watermark into the karaoke content, wherein the watermark is associated with at least one of a singer and a listener, wherein the watermark is tied to at least one of an embedded content and an action, wherein the watermark is associated with a time index of the karaoke content; and computer usable program code stored in the non-transitory storage medium, if said computer usable program code is executed by a processor it is operable to detect an utterance associated with a consumer interacting with the playback of the karaoke content, and when the utterance matches a previously established keyword tag, automatically embedding a digital marker associated with a consumer and the karaoke content that was selected by the consumer into the karaoke content at a time index of the utterance's occurrence.

19. The computer program product of claim 18, wherein the watermark is associated with a symbol, a shape, an audio/video content, a text, and a social media content.

\* \* \* \* \*